Figure 1:
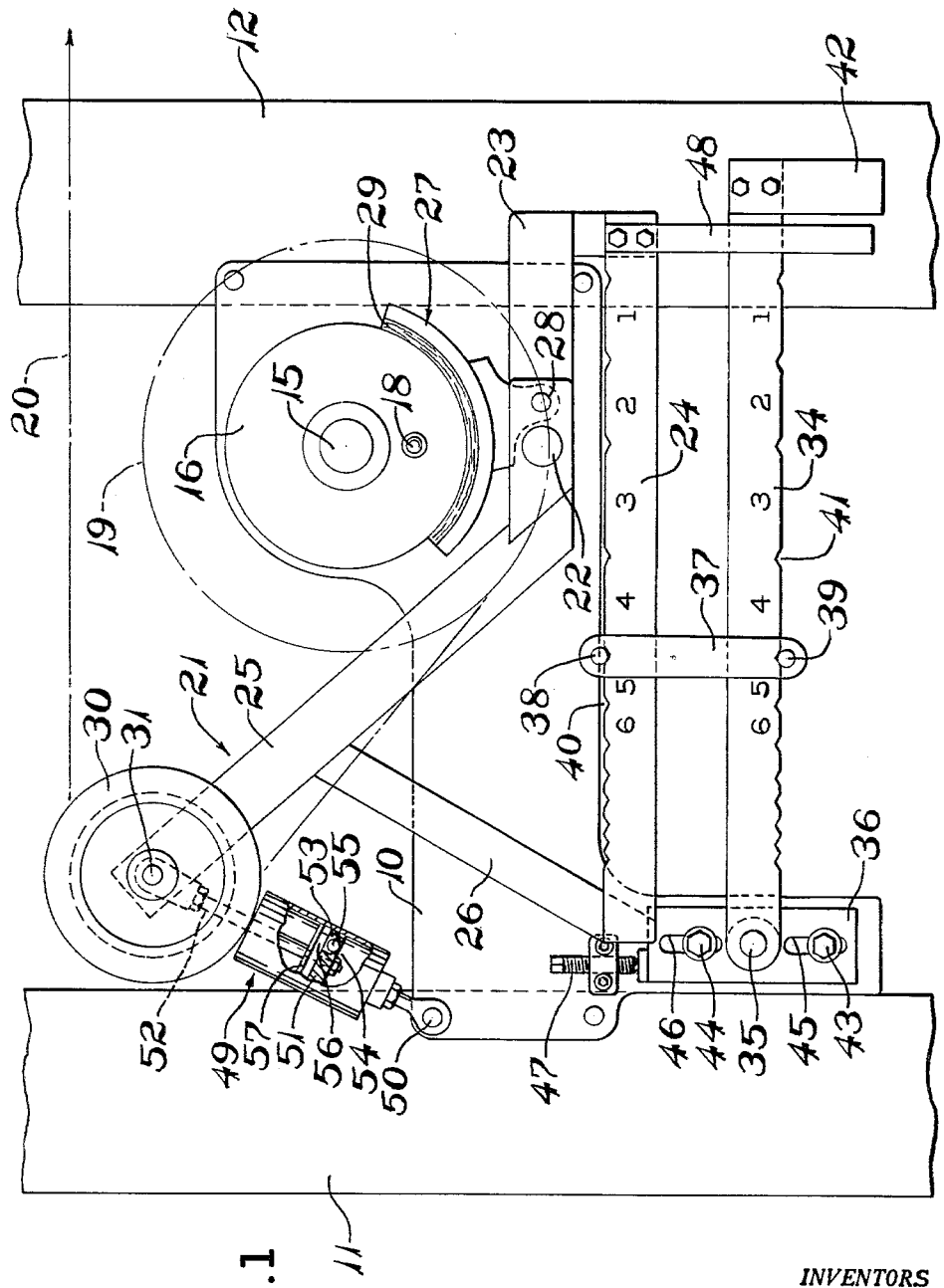

INVENTORS
MERLE A. FULLER
BY RAYMOND J. SLEZAK
W. A. Shira, Jr.
ATTY.

United States Patent Office 3,223,352
Patented Dec. 14, 1965

3,223,352
LET-OFF APPARATUS
Merle A. Fuller and Raymond J. Slezak, Akron, Ohio, assignors to The B. F. Goodrich Company, New York, N.Y., a corporation of New York
Filed Feb. 11, 1964, Ser. No. 344,136
6 Claims. (Cl. 242—156.2)

This invention relates to let-off apparatus for flexible filamentary material and, more particularly, to an improved apparatus for regulating the tension under which such material is unwound from a supply spool.

The term "filamentary material" is used herein as inclusive of both single and multifilaments of metal, natural and synthetic fibers, and glass with the multifilament forms including strands, cords and cables. Such material, when employed in manufacturing operations, is generally supplied in wound form, the units of which will hereinafter be generically referred to as spools. The removal of the filamentary material from such supply spools is ordinarily effected by supporting the spools for rotation and leading the material therefrom over a suitable guide or guides under control of a brake mechanism to regulate the tension in the material as it leaves the spool. Although many such mechanisms are now known, their operations have not been uniformly satisfactory.

The apparatus of this invention permits the accurate preselection of the tension under which the filamentary material is removed from a supply spool and close regulation of that tension as the pull exerted on the material varies. This is achieved by the selective application of a braking force on the supply spool. The mechanism for applying this braking force comprises a lever which carries a guide over which the filamentary material is removed from the supply spool with the pivot for the lever located between the portion thereof which carries the guide and the portion on which the brake is supported so that variations in tension of the material rock the lever to vary the braking force. In the preferred embodiment of the invention, the axis of the spool support and the pivot for the brake operating lever extend generally horizontally in vertical alignment.

The braking force is preselected by setting of a force applying means that is adjustable longitudinally of the lever and to either side of the pivot for the lever. The load-applying means is preferably a second lever pivoted at one end with a link adjustable longitudinally therealong and along the first-mentioned lever to provide an interconnection between the levers. Uniformity in tension of the material as it is withdrawn from the supply spool is further achieved by retarding the rate of movement of the brake operating lever in the brake releasing direction while permitting more rapid movement in the reverse direction.

Figure 2:
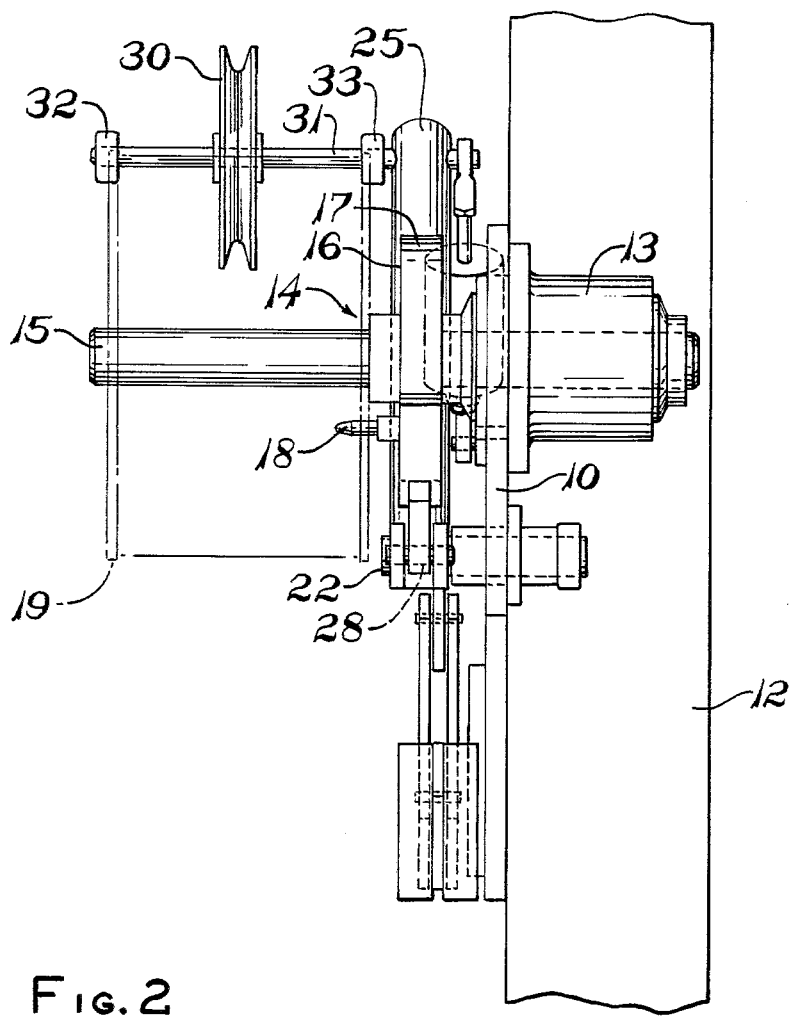

The nature and advantages of the invention are hereinafter further described with reference to the accompanying drawings, forming a part of this application, in which:

FIG. 1 is a front elevational view of the presently preferred embodiment of the invention with a supply spool and the filamentary material being removed therefrom indicated by dot-dash lines; and FIG. 2 is a side elevation of the apparatus illustrated in FIG. 1.

The let-off apparatus of this invention is a self-contained unit mounted upon a generally vertically extending supporting plate 10 which is shown bolted to vertically extending members 11 and 12 that may be a part of a frame on which a plurality of similar devices are mounted for supply of filamentary material to a manufacturing operation. The plate 10 has a bore through the upper portion thereof provided with a cylindrical bushing 13 in which a supply spool supporting means 14 is rotatably mounted. This means comprises a rotatable shaft 15 the axis of which is substantially horizontal. The shaft 15 projects forwardly from the supporting plate 10 and is provided, adjacent the supporting plate, with a brake drum 16 which has a cylindrical braking surface 17. The brake drum 16 is fixed to the shaft 15 for rotation therewith and carries a forwardly projecting pin 18 which is adapted to engage in a suitable opening of the supply spool 19 for the filamentary material 20 that is supported on the forwardly projecting portion of the shaft 15. Hence, rotation of the spool 19 as filamentary material is withdrawn therefrom rotates the shaft 15 and the brake drum 16.

The mounting plate 10 also rockably supports a lever 21 which is pivoted intermediate its ends by a shaft 22 carried by the plate 10 and extending horizontally therefrom substantially in vertical alignment with the shaft 15. The lever 21 comprises a generally horizontally extending portion 23 in which the pivot shaft 22 is provided and a longer horizontally extending portion 24 rigidly connected with the portion 23 in spaced relationship therebeneath. The lever 21 also comprises a diagonally extending portion 25 united with the portion 23 and braced to the portion 24 by a second diagonally extending portion 26. The lever 21 is, therefore, of the first class and is provided on one side of its pivot with a brake means cooperating with the braking surface 17 and on the opposite side of the pivot with a guide means for the filamentary material 20.

In the embodiment shown, the brake means comprises an arcuate brake shoe 27 which is pivoted at 28 to the horizontal portion 23 of the lever 21. The brake shoe 27 is provided with suitable friction material 29 which, when the lever 21 rocks counterclockwise as viewed in FIG. 1, engages the braking surface 17 of the brake drum 16 and exerts braking force thereon and upon the supply spool 19. Clockwise rotation of the lever 21 moves the brake shoe 27 in a direction which reduces the braking force upon the brake drum and hence upon the supply spool 19.

The guide means, over which the filamentary material 20 being removed from the spool 19 passes, is here shown as a sheave 30 rotatable upon a shaft 31 extending generally horizontally from the outer end of the portion 25 of the lever 21. The sheave 30 may move axially along the shaft 31 with the extent of its movement being limited by collars 32 and 33 which are spaced apart a distance that is substantially the same as the axial extent of the supply spool 19.

The construction is such that the filamentary material 20 is led, as shown in FIG. 1, from the spool 19 over the sheave 30 and to the place of utilization. As the filamentary material is removed, the tension exerted thereon tends to rock the lever 21 in the clockwise direction around the pivot 22. This moves the portion 23 of the lever in the direction reducing the braking force exerted by the brake shoe 27. As the tension in the material 20 is reduced, the lever 21 rocks in the reverse direction increasing the braking force upon the spool thereby preventing it from overrunning.

The action of the lever 21 in thus applying and relieving the braking force is predetermined by means of an adjustable load applied upon the portion 24 of the lever. This adjustable load is supplied by a second lever 34 which is pivoted at one end upon a shaft 35 carried by an adjustable mounting 36 that is connected with the supporting plate 10. The load applying lever 34 extends generally parallel with the portion 24 of the lever 21 and is spaced therebeneath. The two levers are selectively interconnected by a link means 37 comprising two spaced members extending on either side of the levers and interconnected adjacent their upper and lower ends by pins 38, 39 which are adapted to be respectively positioned in notches 40 and 41 upon the two levers. These notches 40 and 41 are vertically aligned and are suitably spaced to provide predetermined turning moments for the lever 21, the weight of the lever 34 being augmented by a fixed weight 42 at the free end thereof. Suitable indicia may be provided on the levers adjacent the notches 40 and 41 to indicate the tension resisting force provided by a selected setting of the link means 37.

The position of the pivot end of the lever 34 is adjustable by loosening the bolts 43 and 44, which extend through slots 45 and 46 of the mounting member 36 and into the plate 10, and then actuating the adusting screw 47 which is threadably carried by the plate 10 and abuts the upper portion of the mounting member 36. When the proper position of the mounting member 36 has been secured, the bolts 43 and 44 are tightened. The maximum extent of movement of the lever 34 away from the portion 24 of lever 21 is limited by the U-shaped member 48 connected with the portion 24 of lever 21 and extending vertically downward therefrom with the lever 34 extending therethrough.

The preferred embodiment of the invention also includes a means which retards brake release upon initial increase in tension upon the filamentary material 20 while permitting a more rapid application of the brake when the tension in the filamentary material is reduced. This insures more uniform operation with less danger of overrun as has occurred heretofore with many let-off mechanisms, especially when the filamentary material has been subject to jerks or other fluctuating tensions during use.

The means for providing this selective retardation of brake release and more rapid application of the brake comprises a fluid containing dashpot 49, the cylinder of which is pivotally connected to the supporting plate 10 as indicated at 50. The dashpot 49 is provided with a piston 51 carried by a piston rod 52 the upper end of which is pivotally connected with the shaft 31 carried by the portion 25 of the lever 21. The piston 51 is provided with one or more recesses 53 extending inwardly from the upper surface of the piston 51 with a restricted bore 54 extending from the bottom of each recess through the lower side of the piston. Within each recess 53 is a ball 55 of greater diameter than the bore 54 and of lesser diameter than the recess 53. These balls are retained in the recesses by a disk-shaped retainer 56 which is of sufficient diameter to prevent displacement of the balls 55 from the recesses without covering the entire upper openings of the recesses. Between the retainer 56 and the shouldered end of the piston rod 52, upon which the piston and retainer are mounted, is a splash guard 57.

The construction is such that, when the lever 21 rocks in a clockwise direction, the motion is retarded by the dashpot 49 since the flow of fluid to the lower side thereof is restricted by the balls 55 which tend to cover the bores 54 and thereby reduce the flow of liquid therethrough. When the lever 21 rocks in the counterclockwise direction, namely in the direction which effects brake engagement, however, the downward movement of the piston 51 in the dashpot causes the fluid beneath the piston to flow through the bores 54 displacing the balls 55 and hence permitting a more rapid movement of the lever in this direction than in the reverse direction. Hence, application of the braking force of the shoe 27 is more rapid than is release of the braking force. This provides for greater uniformity of tension in the portion of the filamentary material 20 being removed from the supply spool 19 even though there is widely varying tension upon the portion of this material after it leaves the guiding means 30. Hence, there is less danger of overrunning of the supply spool 19 upon release of tension upon the filamentary material or damage of the latter from excessive tension therein.

The let-off apparatus of this invention provides a wide selection of predetermined tension for the removal of the filamentary material 20 from the supply spool by virtue of the application of the load to the lever 21 through the adjustable link connection with the load applying lever 34. Furthermore, the utilization of a lever of the first class as the means for supporting the brake shoe and the filamentary guide with the load-applying portion 24 of the lever so arranged as to extend on both sides of the pivot 22 permits the load applied through the link 37 to act either in the direction which increases the braking force exerted by the dead weight of the mechanism or so that it decreases that force. Hence, the apparatus is capable of regulating tension of low as well as high order with a simple repositioning of the link 37.

The invention has been described in detail as it is embodied in the preferred embodiment thereof and with specific reference to the details of the manner in which that embodiment is constructed. It is to be understood, however, that the principles of the invention can be embodied in apparatus wherein the detaails are modified from the form illustrated and described. Hence, the invention is not to be considered as limited to the specific details of the preferred embodiment except as may be required by the spirit and scope of the appended claims.

Having thus described the invention, we claim:

1. A let-off for flexible filamentary material comprising:
   (a) a stationary support,
   (b) means on said support rotatably supporting a supply spool of the filamentary material,
   (c) a braking surface on said spool supporting means,
   (d) a lever pivoted on said stationary support adjacent the spool supporting means,
   (e) brake shoe means mounted on said lever for braking engagement with said braking surface to selectively apply and release braking force upon said spool supporting means in response to rocking movement of said lever,
   (f) guide means for the filamentary material supported on said lever at a location such that tension in the filamentary material extending from the supply spool over said guide means applies lever rocking force in the direction for effecting brake release,
   (g) a force applying lever pivotally mounted on said stationary support and extending generally parallel with and in spaced relationship from the first-mentioned lever, and
   (h) link means engaging both levers and movable longitudinally therealong to vary the force exerted by the force applying lever upon the first-mentioned lever.

2. A let-off for flexible filamentary material comprising:
   (a) a stationary support,
   (b) means on the support rotatably supporting a supply spool of the filamentary material,
   (c) a brake drum on said spool supporting means,
   (d) a lever pivoted intermediate its end on said support,
   (e) brake shoe means mounted on said lever at one side of the pivot thereof and engageable with said brake drum to selectively apply and release braking force in response to rocking of the lever,
   (f) guide means for the filamentary material supported upon said lever on the opposite side of the pivot from the location of the brake shoe means,
   (g) a force applying lever pivotally mounted adjacent one end upon said stationary support and extending generally parallel with and spaced from the first-mentioned lever, and
   (h) link means engaging both levers and movable longitudinally therealong to preselected positions to thereby predetermine the tension in the filamentary material which effects brake operation.

3. A let-off for flexible filamentary material comprising:
  (a) a stationary support,
  (b) means on the support removably rotatably supporting a supply spool of the filamentary material,
  (c) a brake drum on said spool supporting means,
  (d) a lever pivoted intermediate its end on said support,
  (e) brake shoe means mounted on said lever at one side of the pivot thereof and engageable with said brake drum to selectively apply and release braking force in response to rocking,
  (f) guide means for the filamentary material supported upon said lever on the opposite side of the pivot from the location of the brake shoe means,
  (g) a force applying lever pivotally mounted adjacent one end upon said stationary support and extending generally parallel with and spaced from the first-mentioned lever,
  (h) link means interconnecting said first and second levers and movable longitudinally therealong to preselected positions to thereby determine the tension in the filamentary material which effects brake operation, and
  (i) means connected to said first-mentioned lever acting to retard rocking thereof in the direction of brake release while permitting more rapid movement of the lever in the opposite direction.

4. A let-off for flexible filamentary material as defined in claim 3 wherein the last-mentioned means is a fluid-containing dashpot.

5. A let-off for flexible filamentary material as defined in claim 3 wherein the said link means is movable along the first-mentioned lever on either side of its pivot.

6. A let-off for flexible filamentary material as defined in claim 3 wherein the axis of the spool supporting means and the pivot for the first-mentioned lever extend generally horizontally in vertically aligned relationship.

References Cited by the Examiner

UNITED STATES PATENTS

| | | | |
|---|---|---|---|
| 1,462,604 | 7/1923 | Lavalle | 242—156.2 X |
| 2,215,121 | 9/1940 | Harvey et al. | 242—156.2 X |
| 2,920,840 | 1/1960 | Cooper | 242—156.2 |
| 2,983,468 | 5/1961 | Perrella | 242—156.2 |
| 3,147,931 | 9/1964 | Cohen | 242—45 |

FOREIGN PATENTS

| | | |
|---|---|---|
| 230,593 | 10/1960 | Australia. |
| 787,357 | 7/1935 | France. |
| 793,404 | 11/1935 | France. |
| 532,277 | 8/1955 | Italy. |

OTHER REFERENCES

Heiner, German App. No. 1,024,913, Pub. February 1958.

MERVIN STEIN, *Primary Examiner.*

S. N. GILREATH, *Examiner.*